United States Patent [19]
Vos

[11] 3,741,580
[45] June 26, 1973

[54] OCCUPANT RESTRAINT SYSTEM
[75] Inventor: Thomas H. Vos, Rochester, Mich.
[73] Assignee: General Motors Corporation, Detroit, Mich.
[22] Filed: Aug. 27, 1971
[21] Appl. No.: 175,661

[52] U.S. Cl. ............ 280/150 AB, 180/103, 102/31, 102/37.7, 102/39
[51] Int. Cl. .......................................... B60r 21/08
[58] Field of Search ............. 280/150 AB; 180/103, 180/91; 102/31, 37.7, 39, 38

[56] References Cited
UNITED STATES PATENTS

| | | | |
|---|---|---|---|
| 3,638,964 | 2/1972 | Chute | 280/150 AB |
| 3,582,107 | 6/1971 | Goetz et al. | 280/150 AB |
| 3,663,035 | 5/1972 | Norton | 102/39 X |
| 3,684,309 | 8/1972 | Uchiyamada | 280/150 AB |
| 3,495,675 | 2/1970 | Hass et al. | 280/150 AB X |
| 3,420,572 | 1/1969 | Bisland | 280/150 AB X |

Primary Examiner—Leo Friaglia
Assistant Examiner—John P. Silverstrim
Attorney—W. E. Finken and Herbert Furman

[57] ABSTRACT

A vehicle body occupant restraint system includes a source of pressure fluid, such as a pressure vessel of stored gas or a gas generator, an inflatable occupant restraint cushion, and a passage communicating with the cushion. The passage is communicated with the source by a first plug having an internal cylindrical bore opening at one end to the source and being of at least the same cross sectional area as the passage to provide unrestricted flow from the source to the cushion through the plug bore and passage. A radially inwardly extending web or flange at the other end of the bore and an adjacent rupturable flange join the plug to an internally threaded plug head. An externally threaded head of a second plug is received within the head of the first plug. The second plug head includes an internal cylindrical bore which opens at one end to the passage across an explosively rupturable diaphragm. The other end of the bore opens to a hollow cylindrical extension which extends through the first plug to the source. The second plug bore and extension are of lesser cross sectional area than the first plug bore and passage. A first pair of electrically fired detonators within the second plug head seat against the diaphragm and are located in place by conventional stemming material. The space between the first plug and the extension of the second plug receives a second pair of electrically fired detonators which seat against the radial flange of the first plug and are located by conventional stemming material. The pairs of detonators are connected in parallel with each other and in series across a source of power and respective impact force responsive control systems. When an impact of predetermined low level intensity is sensed, the first pair of detonators are fired to remove the diaphragm and release the pressure fluid for flow through the extension and head of the second plug to the passage and to the cushion to inflate the cushion. The rate of flow of the pressure fluid is reduced since the bore and extension of the second plug are of lesser cross sectional area than that of the passage. This increases the inflation time of the cushion. When an impact of predetermined higher level intensity is sensed, the second pair of detonators are additionally fired to rupture the flange and remove the second plug and plug head from the first plug to permit unrestricted flow of pressure fluid to the cushion at the normal rate. The pairs of detonators may also be sequentially fired at the lower pulse level.

4 Claims, 5 Drawing Figures

PATENTED JUN 26 1973 3,741,580

INVENTOR.
Thomas H. Vos
BY Herbert Furman
ATTORNEY

INVENTOR.
Thomas H. Vos
BY Herbert Furman
ATTORNEY

OCCUPANT RESTRAINT SYSTEM

This invention relates generally to vehicle occupant restraint systems and more particularly to a multiple level vehicle occupant restraint system including an occupant restraint cushion which is inflatable from a source of pressure fluid at various predetermined rates in accordance with predetermined levels of intensity of vehicle impact.

Occupant restraint systems are known which include a stored gas pressure vessel communicating with an inflatable occupant restrain cushion across a rupturable diaphragm. The diaphragm is conventionally ruptured by electrically fired detonators and, when ruptured, permits flow of the contents of the pressure vessel to the cushion. It is also known to use a gas generator in place of the pressure vessel and a fluid pressure rupturable diaphragm in place of the detonator rupturable diaphragm. Likewise, it is known to use a gas generator containing stored gas, commonly known as an augmented arrangement.

In such systems, the pressure fluid is released for flow to the cushion when the vehicle receives an acceleration pulse exceeding a predetermined minimum level of amplitude and time.

It is known to provide a continuously variable area orifice which varies the rate of flow to the cushion in accordance with the pressure of the released fluid, as disclosed in Ser. No. 85,490 Prachar, "Occupant Restraint System," filed Oct. 30, 1970. It is also known to provide a continuously variable area orifice which varies the rate of flow in accordance with the intensity of the pulse, as disclosed in Ser. No. 119,483 Culver, "Occupant Restraint System," filed Mar. 1, 1971.

The system of this invention provides at least two flow paths providing at least two predetermined rates of flow from between the pressure fluid source to the cushion. One flow path provides flow of pressure fluid to the cushion at a predetermined restricted rate, and the other flow path provides flow of pressure fluid to the cushion at a predetermined unrestricted or substantially full rate. The flow path is selected in accordance with predetermined levels of intensity of vehicle impact. If the impact intensity is above a predetermined minimum level and not exceeding a predetermined higher level, the first flow path is selected so that the pressure fluid flows at a restricted rate to the cushion and the inflation time of the cushion is increased beyond the normal inflation time. If the pulse exceeds a higher level, then the second flow path is additionally selected and the pressure fluid flows to the cushion at the normal rate and the cushion inflates in the normal inflation time. The selection of the second flow path can be delayed for a predetermined time interval so that the initial inflation or deployment of the cushion is at the increased inflation time rate and the final inflation or deployment is at the normal rate. Thus, predetermined rates of flow can be selected in accordance with predetermined levels of intensity of impacts received by the vehicle.

In the preferred embodiment of the invention, the outlet of the pressure vessel receives an internally bored first plug which opens at one end to a passage which communicates with the cushion. A second internally bored plug extends through the bore of the first plug and is joined thereto by a rupturable web at the other end of the bore of the first plug. The one end of the bore of the second plug opens to the passage and the other end is closed by a rupturable diaphragm. The other ends of both plugs communicate, when open, with the vessel. The bore of the first plug is of at least equal orifice area to that of the passage so that flow at unrestricted or full rate can be obtained if the fluid flows through this bore. The bore of the second plug is of lesser orifice area than that of the passage so that flow at a lesser or minimum rate is obtained if the fluid flows through this bore. When the intensity of impacts received by the vehicle is above a predetermined minimum level but below a predetermined upper level, detonators adjacent the diaphragm of the second plug are electrically fired to rupture the diaphragm and release the pressure fluid for flow at the lesser rate to the cushion. This increases the inflation time of the cushion. When the impact intensity equals or exceeds the predetermined upper level, detonators adjacent the rupturable web are electrically fired to rupture this web and obtain an unrestricted or full rate of flow of the pressure fluid to the cushion. The detonators for the web are fired simultaneously with the detonators for the diaphragm when the impact intensity equals or exceeds the predetermined upper level. When the pulse is above the minimum but below the upper level, the detonators for the web may also be fired a predetermined time interval after firing of the detonators for the diaphragm. Thus, the initial inflation of the cushion is at the increased inflation time rate and the final inflation is at the normal rate. A multiple level system is thus obtained.

One feature of this invention is that it provides a vehicle body occupant restraint system wherein predetermined rates of flow of pressure fluid between a source and an inflatable occupant restraint cushion are set by selective actuation of flow control orifices in accordance with predetermined levels of intensity of impact of the vehicle with an obstacle. Another feature of this invention is that it provides a vehicle body occupant restraint system wherein one of a plurality of predetermined rates of flow between a pressure fluid source and an inflatable occupant restraint cushion is obtained by selective actuation of one of a number of flow control orifices in accordance with a predetermined level of intensity of impact being exceeded. A further feature of this invention is that it provides a vehicle body occupant restraint system wherein a passage communicates with an inflatable occupant restraint cushion and a plurality of selectively actuatable predetermined area orifices are provided between the passage and a source of pressure fluid for controlling the rate of flow from the source to the passage in accordance with predetermined levels of impact of the vehicle with an obstacle. Yet another feature of this invention is that the orifices between the passage and the source include a first orifice providing an unrestricted rate of flow to the passage, a second orifice providing a restricted rate of flow to the passage which may be actuated alternately, simultaneously, or sequentially. Yet a further feature of this invention is that the second orifice is normally sealed to the passage and in turn seals the first orifice to the passage, with the second orifice being selectively opened to the passage to provide the restricted rate of flow or being removable to provide an unrestricted rate of flow.

These and other features of this invention will be readily apparent from the following specification and drawings wherein.

Figure 1:
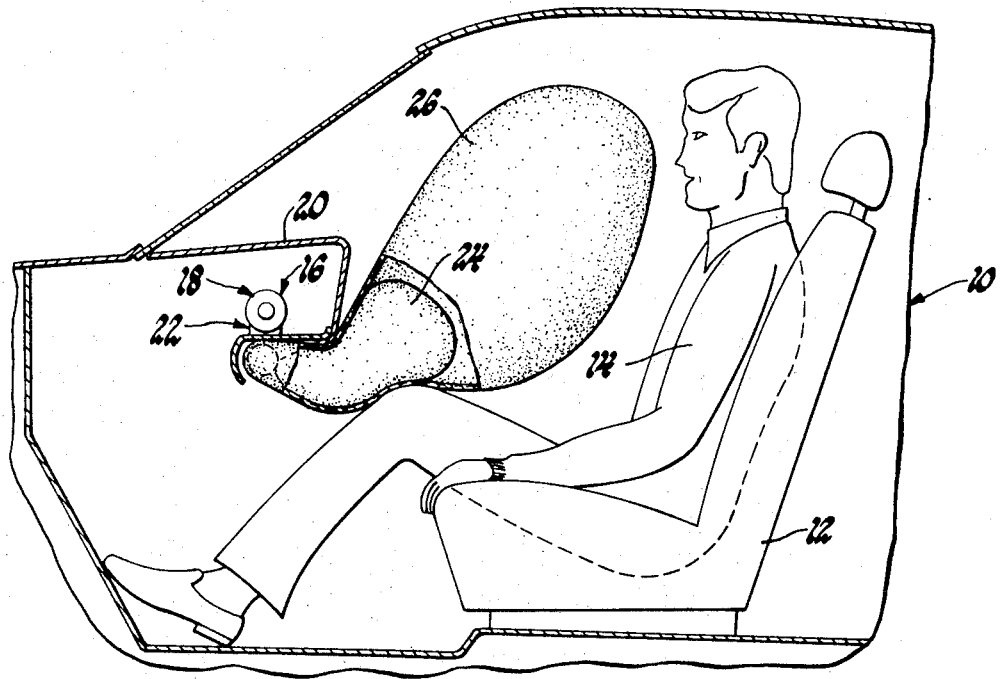
FIG. 1 is a view of an occupant restraint system according to this invention.

Referring now particularly to FIG. 1 of the drawings, a vehicle body designated generally 10 includes a front seat 12 which is conventionally mounted on the vehicle for supporting an occupant 14 in seated attitude. An occupant restraint system designated generally 16 includes an inflater 18 conventionally mounted within the instrument panel 20 and a manifold and diffuser assembly 22 communicable with the inflater 20 in accordance with predetermined levels of intensity of vehicle impact for inflating a knee cushion 24 and a torso cushion 26 to limit forward movement of the occupant 14 with respect to the instrument panel. The details of the cushions 24 and 26 are not disclosed herein and reference may be had to Ser. No. 11,189 Cole, filed Feb. 13, 1970, now U.S. Pat. No. 3,619,524, issued Oct. 5, 1971 for such details. Likewise, reference may be had to Ser. No. 142,533 Noll et al., filed May 12, 1971, for the details of the inflater 18 and the manifold and diffuser assembly 22.

Figure 2:
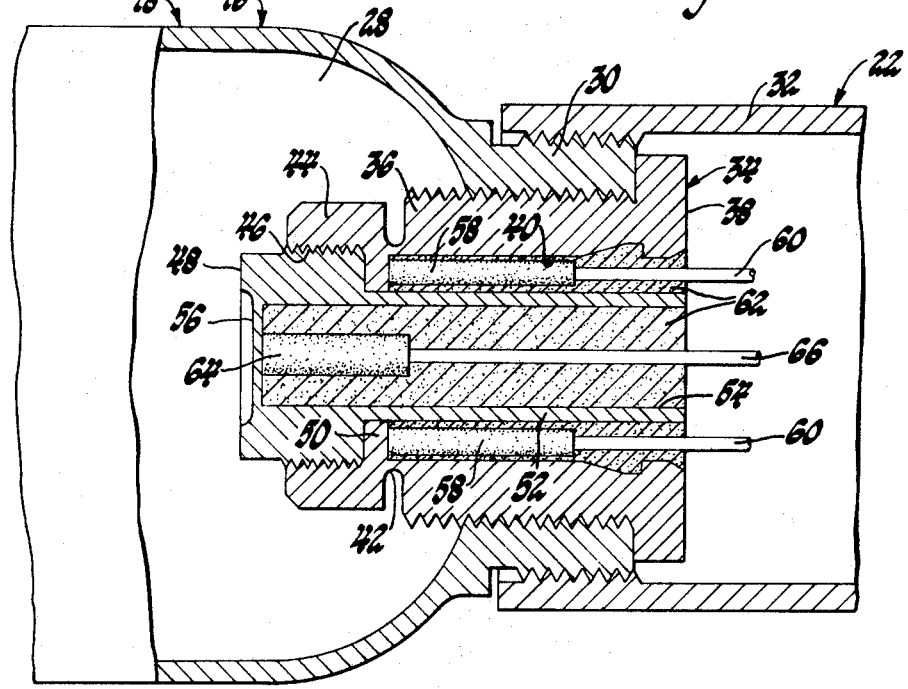
FIG. 2 is an enlarged view of a portion of FIG. 1.

As shown in FIG. 2, the inflater comprises a pressure vessel 28 containing a predetermined volume of stored gas, such as air or nitrogen, under pressure. The inflater may also comprise a conventional chemical gas generator or a combination of a gas generator and stored gas conventionally known as an air augmented system. The cylindrical outlet neck 30 of the pressure vessel is internally and externally threaded. A passage 32 of assembly 22 includes an internally threaded end which is received over the external threads of the neck 30 and provides for communication of the pressure vessel with the assembly 22 and cushions 24 and 26.

The outlet neck 30 receives a valve assembly designated generally 34. Valve assembly 34 includes a first cylindrical plug member 36 which is externally threaded so as to be received within the internal threads of neck 30. Plug member 36 includes a hex or other polygonally shaped head 38 which engages the end of the outlet neck and a cylindrical bore 40 of predetermined diameter which opens at one end through the head 38 to the passage 32. A neck or reduced thickness web or flange 42 at the other end of bore 40 joins the plug member 36 to a plug head 44 provided with a threaded cylindrical bore 46. Bore 46 threadedly receives an externally threaded second plug member 48 which seats against a radially inwardly extending web or flange 50 of head 44. The plug 48 includes an integral hollow cylindrical extension 52 which extends through the opening of flange 50 and through the bore 40 to the one end of plug member 36. The other end of the cylindrical bore 54 defined by the extension 52 and an equal diameter bore of plug member 48 is conventionally closed by an integral rupturable diaphragm 56 which may be conventionally cross or X scored. Bore 54 is of predetermined diameter less than the diameter of bore 40.

A first pair of conventional detonators 58 are located diametrically opposite of each other within the space between the bore 40 and the outer surface of extension 52. Detonators 58 seat against flange 50 and the firing wires 60 of the detonators extend outwardly through head 38 for electrical connection to a control system as will be further described. The detonators 58 are located by filling the space between the extension 52 and bore 40 with conventional stemming material 62.

A pair of like detonators 64 are located within the bore 54 and seat against the diaphragm 56. The detonators 64 are located in side-by-side relationship and the firing wires 66 of these detonators extend outwardly of the extension 52 for connection to the control system previously mentioned. The bore 54 is also filled with the stemming material 62 to locate the detonators 64 in place.

The bore 54 has a diameter of approximately one-half inch and the bore 40 a diameter of one inch in the specific embodiment shown. If the detonators 64 are electrically fired to remove the diaphragm 56, it can be seen that the pressure fluid from the vessel 28 will flow through the bore 54 to the passage 32 and thence to the cushions 24 and 26 to inflate the cushions. Since the diameter of the bore is less than that of the passage, the bore provides a restricting flow control orifice. Thus, the rate of flow to the cushion is decreased and the time period of inflation of the cushion is increased beyond that which would result if no such restricting flow control orifice were provided.

If the detonators 58 are electrically fired, the flange 42 will be ruptured or fractured to remove the plug head 44 and plug member 48 so that pressure fluid from the vessel now flows through the bore 40 to the passage 32 and thence to the cushions 24 and 26. Since the bore 40 has a diameter of approximately one inch in the specific embodiment shown, the rate of flow of fluid to the cushions through this bore is the normal rate and is greater than the first rate of flow through bore 54 and, of course, the time period required for inflation of the cushions 24 and 26 is less. The bore 40 provides a flow control orifice as does the bore 54.

Figure 3:
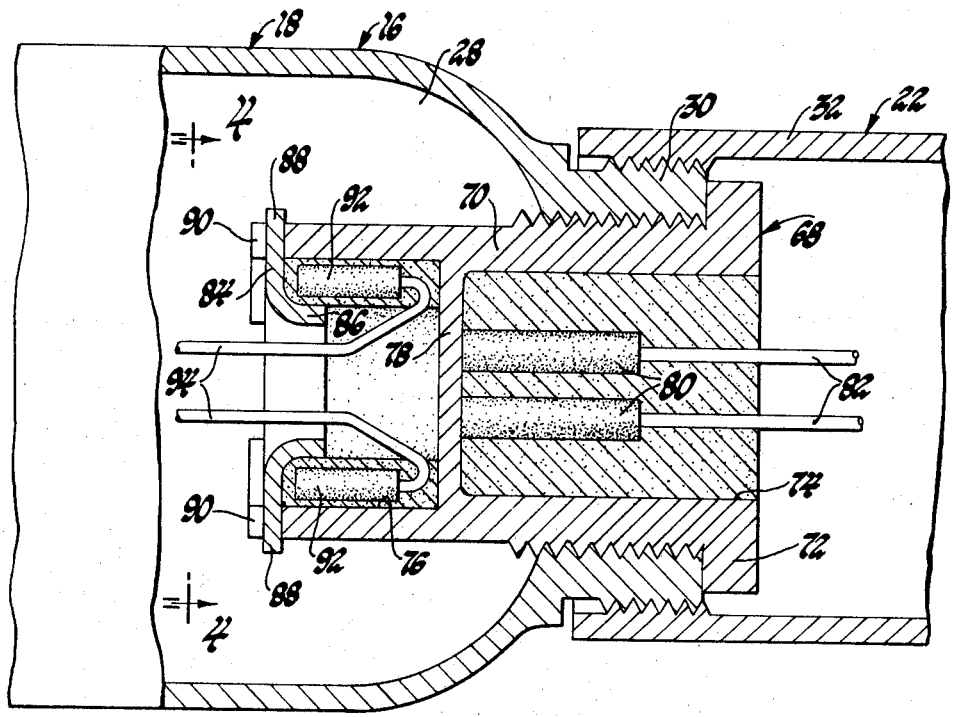
FIG. 3 is a view showing a modification of the invention.
Figure 4:
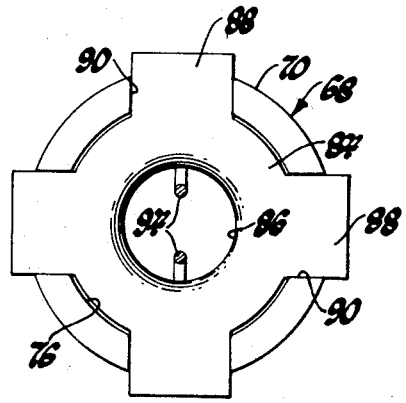
FIG. 4 is a view taken generally along line 4—4 of FIG. 3.

FIGS. 3 and 4 show a modification which will now be described, with like numerals being used for like parts. The plug assembly 68 includes a partially externally threaded cylindrical plug member 70 which is received within the internally threaded outlet neck 30 of the pressure vessel. Member 70 includes integral hexagonal or other polygonally shaped head 72 at one end which engages the end of the neck. The member 70 includes a first internal cylindrical bore 74 of predetermined diameter and a second internal cylindrical bore 76 of greater diameter than bore 74 with the bores being closed to each other by an integral rupturable diaphragm 78 which may be conventionally X or cross scored.

A pair of conventional detonators 80 are located within bore 74 and seat against the diaphragm 78. The firing wires 82 of the detonators extend outwardly of the bore 74 and the bore is conventionally filled with stemming material to locate the detonators in place.

A flow control orifice member 84 is of generally cruciform shape, as shown in FIG. 4, and includes an integral cylindrical extension 86 received within the bore 76. The arms 88 of member 84 are received within slots 90 provided in the other end of member 70 and may be staked in place within such slots or electron beam welded or otherwise releasably secured in place. The axis of the extension 86 is coaxial with that of the bores 74 and 76. A second pair of detonators 92 are located within the bore 76 and the annular space between the bore and the extension 86 is conventionally filled with stemming material to locate the detonators 90 in place. The firing wires 94 of the detonators 90 extend outwardly through extension 86 and thence outwardly of the pressure vessel 28 in a conventional manner for connection to the control system to be described.

The bore 74 has a diameter of approximately 1 inch in the specific embodiment shown while the extension 86 of member 84 has an internal diameter of approximately one-half inch. If the detonators 80 are fired to remove the diaphragm 78, the pressure fluid flowing from the pressure vessel to the passage must flow through the extension 86 which functions as a flow control orifice in the same manner as the extension 52 of plug member 48. Thus the normal inflation time of the cushions 24 and 26 will be increased due to the decreased flow rate.

If the detonators 92 are additionally fired, the member 84 will be removed from the plug body 70 so that the pressure fluid flowing to the cushions 24 and 26 flows through the bores 74 and 76 and the bore 74 functions as the flow control orifice in the same manner as bore 40. Thus, the cushion will be inflated in a normal time period.

It should also be noted that instead of alternately firing the pairs of detonators in both embodiments of the invention, such pairs of detonators may be sequentially fired with an intervening predetermined time period. In such instance the initial inflation of the cushion would be at the increased time rate and reduced flow rate and the subsequent final inflation of the cushion would be at the normal time period and normal flow rate.

Figure 5:
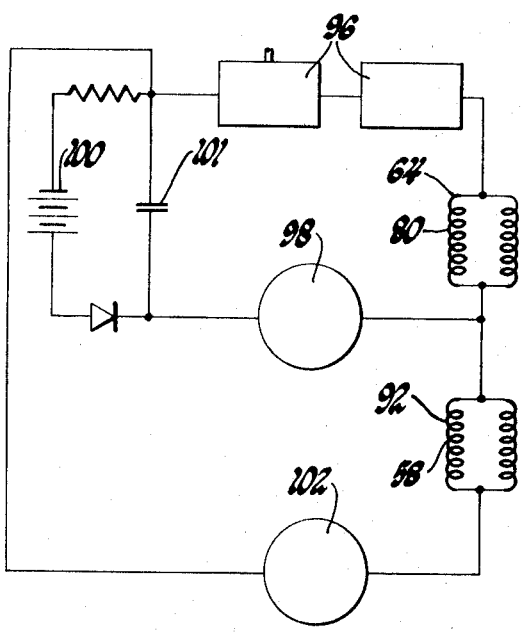
FIG. 5 is a schematic of a control system.

FIG. 5 shows the control system controlling the firing of the pairs of detonators 58 and 64 of the first embodiment or the pairs of detonators 80 and 92 of the second embodiment. Such control system is disclosed in detail in copending application Ser. No. 175,576 Jones, filed Aug. 27, 1971 and will therefore only be briefly described herein.

Generally the control system includes a first pair of sensors 96 and 98 connected in series across a source of power 100, a capacitor 101, and the detonators 64 or detonators 80. A sensor 102 is serially connected with sensor 98 across the source of power, capacitor, and the detonators 58 or 92.

The sensor 96 comprises a pressure transducer actuated by the pressure build-up in the telescopic strut of an energy absorbing bumper system and an amplifier for amplifying the signal. The transducer is actuated when the rate of pressure increase indicates that the impact forces will exceed the energy absorption capability of the bumper system. The sensors 98 and 102 are the same as those disclosed in Ser. No. 35,674 Gillund, filed May 8, 1970, now U.S. Pat. No. 3,619,524 issued Nov. 9, 1971. These sensors are inertial sensors actuated by acceleration pulses of predetermined amplitude and time. The sensor 98 is set so as to close from a pulse applied to the strut or to the body by the strut at approximately the level of intensity impact forces required to actuate the transducer of sensor 96. The sensor 102 is set to close at a higher level of acceleration pulses resulting from deformation of the vehicle. The sensors 96 and 98 fire the detonators 64 or 80 prior to the onset of vehicle deformation and when the level of intensity of impact forces is such that deformation of the vehicle is likely to occur or that there is a predetermined probability that it will occur. The sensors 98 and 102 fire the detonators 58 or 92 after the onset of vehicle deformation and when a predetermined level of pulse higher than the pulse required to actuate the sensor 98 occurs. Generally the pulse level required to actuate sensor 98 is from 12 to 15 Gs which would correspond approximately to a relative impact speed exceeding 10 miles per hour while the pulse level required to actuate the sensor 102 is from 20 to 25 Gs which would correspond to a relative speed of impact of 28 to 30 miles per hour. It should also be noted that the detonators 64 or 80 and 58 or 92 may be sequentially fired with an intervening predetermined time delay or interval by connecting them with an appropriate electrical or pyrotechnic type arrangement. In such instance, the detonators 64 or 80 would be electrically fired to initiate inflation of the cushion at the lower flow rate and increased time rate, and then after the time interval, the detonators 58 or 92 would be fired to continue inflation of the cushion at the normal flow rate and in the normal time period. The sensor 102 would not be actuated.

It can be seen that if the vehicle impacts an object at a relative speed sufficient to generate a pulse above 12 Gs but below 20 Gs, only the detonators 64 or 80 will be fired so that the cushion is inflated at a slower rate than normal. Since the speed of impact is in the low range, there is sufficient time for the cushion to be filled and to be in place to limit engagement of the occupant with the instrument panel.

If the impact of the vehicle is sufficient to generate a pulse exceeding 20 Gs, then, of course, both sets of detonators would be simultaneously fired so that the cushion would be inflated in the normal time period and at the normal flow rate.

From the foregoing, it can be seen that this invention provides an occupant restraint system wherein inflation of the cushion may be obtained at various predetermined flow rates and during various predetermined time periods depending on predetermined levels of intensity of impact of the vehicle.

I claim:

1. In a vehicle occupant restraint system including sensor means operative to sense the intensity of vehicle impact, a source of pressure fluid, and an inflatable cushion, the combination comprising, first means operable to provide a first flow path between the source and the cushion permitting flow of pressure fluid at a first predetermined rate, second means normally operable to block the first flow path and provide a second flow path between the source and the cushion permitting flow of pressure fluid at a second predetermined lower rate, and control means responsive to a first predetermined level of intensity sensed by the sensor means for selecting the second flow path and responsive to a second greater predetermined level of intensity for removing the second means from the first flow path and thereby select the first flow path.

2. In a vehicle occupant restraint system including sensor means operative to sense the intensity of vehicle impact, a source of pressure fluid, and an inflatable cushion, the combination comprising, first means operable to provide a first flow path between the source and the cushion permitting flow of pressure fluid at a first predetermined rate, second means normally operable to block the first flow path and provide a second flow path between the source and the cushion permitting flow of pressure fluid at a second predetermined lower rate, means normally blocking the second flow path, and control means responsive to a first predetermined level of intensity sensed by the sensor means for removing the blocking means to thereby select the second flow path and responsive to a second greater predetermined level of intensity for removing the second means from the first flow path to thereby select the first flow path.

3. In a vehicle occupant restraint system including sensor means operative to sense the intensity of vehicle impact, a source of pressure fluid, and an inflatable cushion, the combination comprising, first flow control orifice means operable to provide a first flow path between the source and the cushion permitting flow of pressure fluid at a first predetermined rate, second flow control orifice means closing the first orifice means and providing a second flow path between the source and the cushion permitting flow of pressure fluid at a second predetermined lower rate, means normally blocking the second orifice means, and control means responsive to a first predetermined level of intensity sensed by the sensor means for removing the blocking means to open the second flow path and responsive to a second greater predetermined level of intensity for removing the second orifice means from the first orifice means to open the first flow path.

4. In a vehicle occupant restraint cushion system including a source of pressure fluid and an inflatable occupant restraint cushion, the combination comprising, a passage of predetermined orifice area communicating with the cushion, first means communicating the passage and source and defining an orifice of lesser area than the passage to restrict flow between the source and the passage, second means communicating the passage and source and defining an orifice of at most equal area to that of the passage, means normally blocking flow through the first and second means to seal the passage from the source, means for removing the blocking means from the second means upon receipt by the vehicle of an acceleration pulse of predetermined amplitude and time to permit generally unrestricted flow through the second means to the cushion, and means for removing the blocking means from the first means upon receipt by the vehicle body of an acceleration pulse of predetermined amplitude and time lesser than the amplitude and time of the first pulse to provide restricted flow through the first means to the cushion.

* * * * *

UNITED STATES PATENT OFFICE
CERTIFICATE OF CORRECTION

Patent No. 3,741,580     Dated June 26, 1973

Inventor(s) Thomas H. Vos

It is certified that error appears in the above-identified patent and that said Letters Patent are hereby corrected as shown below:

Column 1, line 12, "restrain" should read -- restraint --.

Column 3, line 26, "U.S. Pat. No. 3,619,524" should read -- U.S. Pat. No. 3,610,657 --.

Signed and sealed this 6th day of August 1974.

(SEAL)
Attest:

McCOY M. GIBSON, JR.
Attesting Officer

C. MARSHALL DANN
Commissioner of Patents